Figure 1:
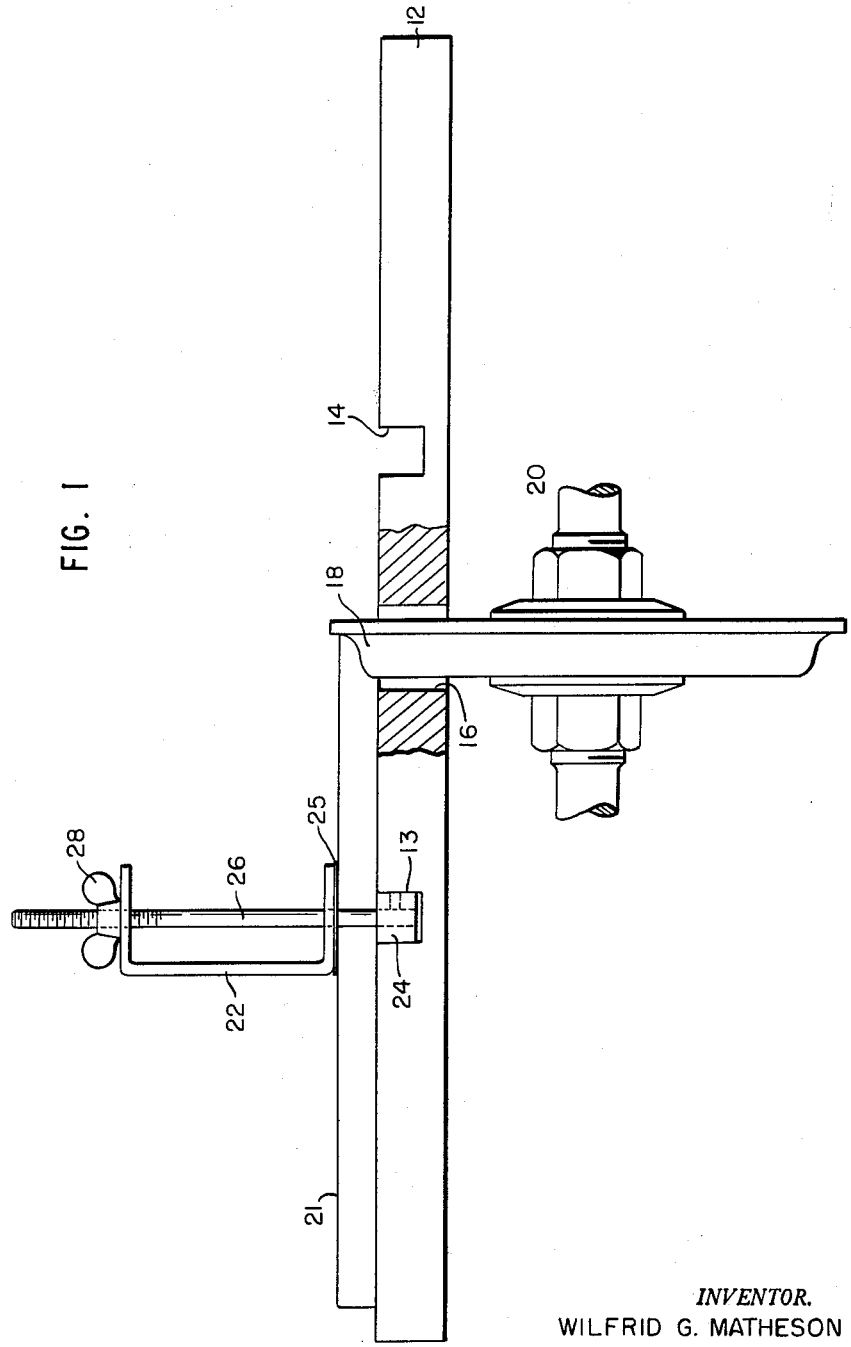

June 23, 1964  W. G. MATHESON  3,138,181
CLAMPING DEVICE

Filed Aug. 22, 1961  2 Sheets-Sheet 1

INVENTOR.
WILFRID G. MATHESON
BY
Kenway, Jenney & Hildreth
ATTORNEYS

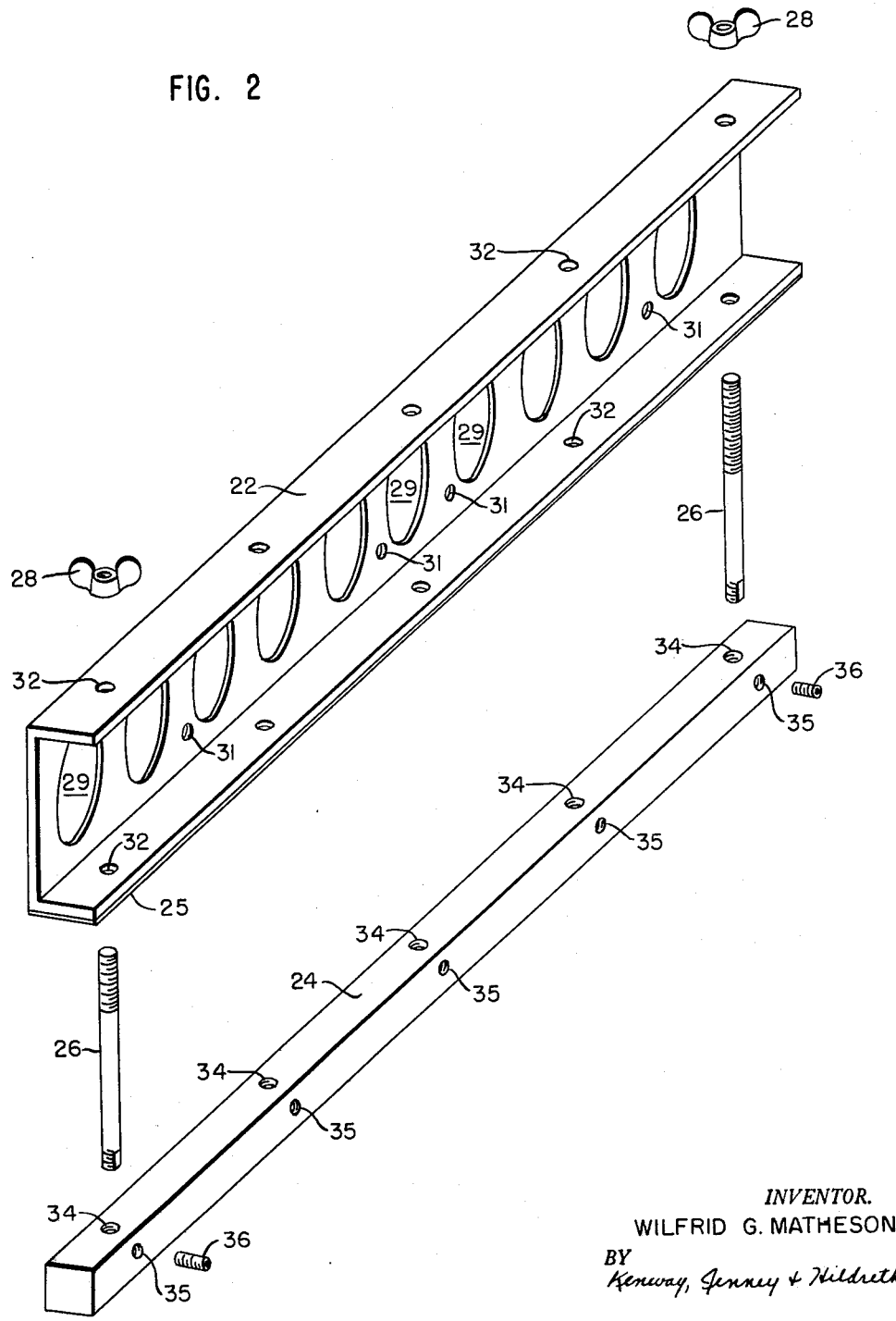

United States Patent Office 3,138,181
Patented June 23, 1964

3,138,181
CLAMPING DEVICE
Wilfrid G. Matheson, 4 Old Salem Road,
Marblehead, Mass.
Filed Aug. 22, 1961, Ser. No. 133,216
1 Claim. (Cl. 144—242)

This invention relates in general to power tools and, in particular, to a clamping accessory for such devices.

Various power tools such as table saws, shapers and the like are marketed not only for industrial and commercial use, but increasingly, for home or amateur use. For the most part, these devices are limited in the functions which they can perform, although various accessories have been provided to broaden their field of utility. Considerable effort has been devoted to guiding mechanisms for holding or directing the work as it is fed to the operating cutter or saw. In particular, there have been developed numerous clamps for holding the work in a desired position. The development of these devices stems from the recognition that the material being worked upon, especially when it is of large dimensions, is quite difficult for the operator of the tool to handle and to maintain in position so that the desired operation may be performed accurately and with a minimum of effort. Despite the attempts which have been made to develop suitable accessories, there is still not available a suitable device for use with work of large dimensions. It is with the solution of such problems that the present invention is primarily concerned.

Although the present invention is applicable to numerous power tools such as those itemized above, it is described below in connection with a table saw of conventional design for purposes of convenience and ease of understanding. The invention has as its primary object the improvement of power tools.

Another object of the present invention is to make possible the cutting-off or shaping of material of dimensions beyond the capacity of known devices.

Still another object of the present invention is to insure accurate cutting and shaping despite the area or thickness of the material being handled.

A further object of this invention is to increase the scope and usefullness of power tools by means of an inexpensive accessory which is immediately adaptable to existing equipment.

In general, the present invention consists of a rigid lightweight clamping bar for holding work in position on the bed of a power tool. The clamping bar is maintained in position by means of suitable studs threaded into a slidebar disposed in the groove or guideway of the bed of the tool. The structure of the clamping bar is such that it is resistant to bowing, and openings for the studs are provided at various points along its length in order that work material of any one of a range of sizes may be accommodated. The clamping bar is preferably constructed of light metal and is skeletonized by the provision of numerous large openings to further reduce its weight. Various other features have been incorporated in the invention such as a ribbon or strip of material of high coefficient of friction attached to the bottom of the clamping bar to bear against the work material and thereby prevent possible movement of the work with resulting spoilage or inaccuracies. Also, suitable openings are provided in the clamping bar to permit the attachment of a transparent safety shield or cross-members to support a second clamping bar or both.

For a better understanding of the present invention, together with other and further objects, advantages and features, reference should be made to the following detailed description of a preferred embodiment of the invention, which should be read in conjunction with the appended drawings, in which:

FIG. 1 is a view, partly in section, of a portion of a table saw, showing the work held in place by the clamping bar; and FIG. 2 is an exploded view, in perspective, of the clamping bar, the studs and the slidebar to which it is attached.

In FIG. 1, there is shown a table 12, which may be that of a conventional table saw. In the upper surface of the table, grooves or guideways 13 and 14 are formed. These are the guideways normally used from the miter gauge. Between the two grooves 13 and 14, an opening 16 is formed in the table through which a cutting blade 18 extends. The blade 18, which is illustrated, is actually a molding cutter, but various cutters including saw blades may equally well be used. As is conventional, the cutting blade is mounted on a shaft 20, which in turn is driven by a motor, either directly or by means of a belt or similar power transmission device. Also, as is conventional, the cutter 18 is movable vertically through the table 12 in order that material of various thicknesses may be worked. Also, the angle of cut may be varied by adjusting the relative angle of the cutter to the table.

A piece of material 21 is shown in place upon the table 12. The material is clamped between the undersurface of a channel clamping bar 22 and a slidebar 24 disposed in the guideway 13. A strip of material of high coefficient of friction 25 (such as sandpaper) is glued or otherwise attached to the lower surface of the clamping bar 22. A stud 26 is threaded into the slidebar 24, and a thumbscrew 28 is threaded upon the upper end of the stud to bear against the upper surface of the clamping bar 22 and hold it in position.

Greater detail on the structure of the clamping bar 22 and the slidebar 24 is found in FIG. 2. The clamping bar 22 is actually a channel member made preferably of aluminum or other light metal, through the broad side of which a plurality of large openings 29 are formed. The openings 29 have not only a functional purpose, but also they contribute to the reduction of weight of the clamping bar. Additional smaller openings 31 are provided adjacent certain of the larger openings to serve as mounting holes for a safety guard (not shown). The safety guard may be of a known type, such as that made of transparent material which allows the operator of the tool to observe the work while it blocks flying particles and also prevents the operator from coming into contact with the cutting tool.

In the flanges of the clamping bar, additional openings 32 are formed. The openings 32 are aligned in pairs, and although only five such pairs are shown, additional openings may be provided for purposes explained below. The openings 32 are of sufficient diameter to clear the studs 26, and the wing nuts 28 are provided within internal threads matching those on the upper portions of the studs. In this connection, it will be noted that a fairly long threaded section is provided on the upper end of the studs in order that work materials of a wide range of thicknesses may be accommodated by the clamping bar and the slidebar.

On the underside of the clamping bar, as noted above, there is provided a friction pad 25 which serves the dual purpose of protecting the material which is clamped beneath the bar from being scored or marked and also eliminating the possibility of the material slipping as work is performed upon it.

The slidebar 24 has formed in its upper surface a series of threaded openings 34 to accommodate the studs 26. As in the case of the openings 32, the exact number which are provided may vary, depending upon dimensional considerations of the material which is to be worked. In any case, an opening 34 will be provided for each aligned pair of openings 32 of the clamping bar. If it is desired to insure against accidental loosening of the studs 26, further openings 35 may be formed in a side of the slidebar. These openings are aligned with the openings 34 and are threaded to accommodate setscrews 36 which are designed to bear upon the studs 26 to maintain them in a fixed position.

In operation, the material 21 is clamped in place between the clamping bar and the slidebar with the studs inserted in openings which are spaced a distance slightly greater than the width of the material being clamped. The structure of the clamping bar 22 is such that its height-to-width ratio prevents bowing which would otherwise occur if, for example, a simple clamping strip were employed. In a situation where the material being worked upon is of large width, as in the case of a door, bowing of the clamp would cause the molding cutter 18 to form an unsymmetrical edge since the middle portion of the material would rise from the saw table due to the curvature of the slidebar. The rigidity of the bar 22 is such that bowing and resultant inaccurate work is completely avoided.

The fact that the clamping bar 22 is composed of skeletonized light metal facilitates handling by the operator. Moreover, the presence of the large openings 29 provides the operator with a hand hold by which he may feed the work into the cutting device. The hands of the operator are in those circumstances well removed from the cutting tool. Material of any reasonable dimension may be handled by the clamping bar and, in a particular instance, a piece of material measuring 48 inches by 48 inches by ¾ inch thick has been cut, mitered, molded, grooved, shaped and otherwise worked on to produce a variety of intricate patterns. Material of even greater dimensions may be handled if proper support is provided by means of table top extensions or the like.

In some applications, it may be desirable to utilize the clamping member on both sides of the cutting tool. The presence of two grooves in conventional table saws, one at either side of the cutting tool, permits the use of a clamping bar on either or both sides, and these may be held in position relative to each other by cross-members if necessary.

The invention has been described primarily in its application to table saws. However, its adaptability to any one of numerous power tools is apparent. Also, the channel shape of the slidebar has proven to be the most easily handled and versatile configuration, but other configurations in which a proper height-to-width ratio are employed would also provide the desired rigidity which prevents bowing of the material being worked on.

These and other alterntives will suggest themselves to those skilled in the art upon a reading of the foregoing specification, but they are believed to be within the purview of the present invention which, accordingly, should be limited only by the spirit and scope of the appended claims.

What is claimed is:

In a power-operated machine having a bed and a driven tool for performing work upon a piece of material, the combination of a first member disposed for sliding movement in an opening formed in said bed adjacent said tool, and means for clamping said piece of material to said first member, said last-mentioned means including a rigid bar having a channel-shaped cross-section, two similar sides and a central connecting section thus being formed, said similar sides having a plurality of relatively small matching openings formed therethrough, said central connecting section having a plurality of large openings formed therethrough, a strip of material of relatively high coefficient of friction fixed to the outer surface of one of said sides of said channel-shaped bar, and studs passing through said relatively small matching openings beyond the edges of said piece of material and threaded into said first member.

References Cited in the file of this patent

UNITED STATES PATENTS

| | | |
|---|---|---|
| 664,530 | Brown | Dec. 25, 1900 |
| 707,641 | Rostochil | Aug. 26, 1902 |
| 2,464,117 | Coates | Mar. 8, 1949 |
| 2,668,568 | Budd | Feb. 9, 1954 |
| 2,785,709 | Shepp | Mar. 19, 1957 |